May 4, 1965 R. S. CHALLENDER 3,181,232
APPARATUS FOR REPLACING AN IMPELLER
Filed Feb. 19, 1963 2 Sheets-Sheet 1

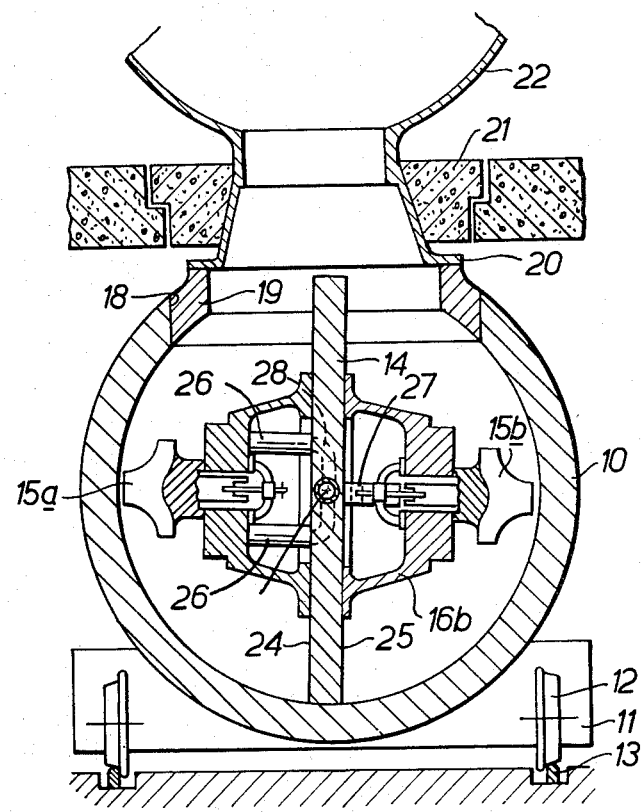

3,181,232
APPARATUS FOR REPLACING AN IMPELLER
Ronald Scott Challender, Appleton, England, assignor to United Kingdom Atomic Energy Authority, London, England
Filed Feb. 19, 1963, Ser. No. 259,511
Claims priority, application Great Britain, Mar. 21, 1962, 10,913/62
3 Claims. (Cl. 29—202)

This invention relates to nuclear reactors, of the kind in which a gaseous coolant under pressure is circulated through the reactor core and at least one heat exchanger by at least one blower and an impeller of the blower is disposed within a pressure vessel surrounding the reactor core and/or the heat exchanger so that the diffusing casing of the blower is also within the pressure vessel.

It is a problem in reactors of this kind to replace the impeller since the replacement involves opening up the pressure vessel and removing an impeller which may be highly active. It is an object of the present invention to provide apparatus by which such replacement may be effected without undue hazard.

According to the invention apparatus for replacing an impeller in a reactor of the kind in which a gaseous coolant under pressure is circulated through the reactor core and at least one heat exchanger by at least one blower and an impeller of the blower is disposed within a pressure vessel surrounding the reactor core and/or the heat exchanger so that the diffusing casing of the blower is also within the pressure vessel, said apparatus comprising a shielded flask having an aperture through which an impeller can pass, an impeller support platform so mounted within the flask that it is rotatable about a horizontal axis with an impeller on both sides of the platform and can present either side to the flask aperture, means for sealing the flask about an aperture in a pressure vessel with the aperture in the flask in register with the aperture in the pressure vessel, means for purging the flask and means on the platform for raising and lowering an impeller through the apertures from and onto the support platform.

Figure 2:
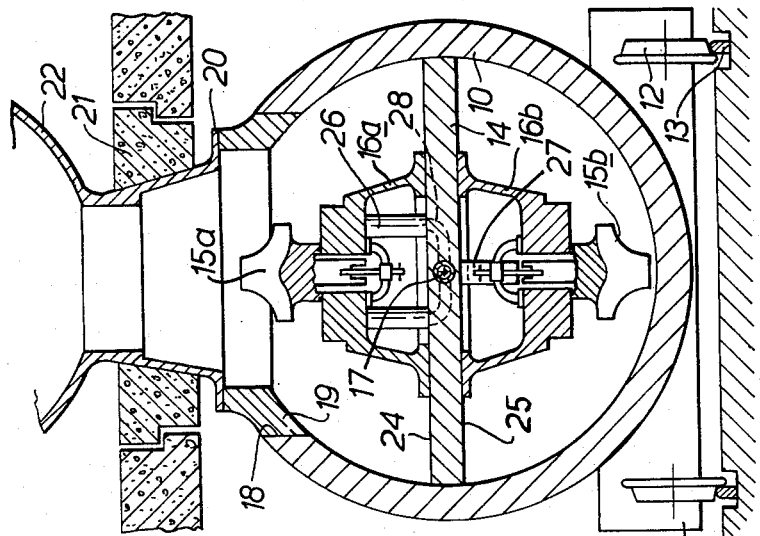

Apparatus embodying the invention will now be described by way of example with reference to FIGURES 1, 2 and 3 of the accompanying drawings which are sectional views.

In the drawings is shown a spherical shielded flask 10 carried on a trolley 11 with wheels 12 which engage rails 13. Mounted within the flask 10 is a support platform 14 able to support on one side 24 an active impeller 15a with a skirt 16a and on the other side 25 a clean impeller 15b with a skirt 16b. The platform 14 is carried by a horizontal rotatable hollow shaft 17 penetrating the flask 10 at a bearing and gland (not shown) and by a stub shaft (not shown) diametrically opposite the hollow shaft and resting in a bearing in a cavity in the flask 10. In the upper part of the flask 10 is an aperture 18 in which is fitted a neck portion 19 movable in a vertical direction to seal to a flange 20 extending through a concrete shield 21. The flange 20 is part of a heat exchanger shell 22 which also serves as a diffusing casing for the impeller 15a, and the skirt 16a, of this impeller 15a is sealed to the shell 22 which thus forms a pressure vessel in which reactor coolant can be contained. Inside the shielded flask 10 jacks 26, 27 are provided on the sides 24, 25 respectively of the platform 14 for raising and lowering the impellers 15a, 15b. Three jacks 26 and three jacks 27 are provided, symmetrically arranged about the centre of the platform 14. The platform 14 has passageways 28 connecting with the jacks 26, 27 and with the inside of the hollow shaft 17. Hydraulic fluid is fed to the jacks 26, 27 by feed pipes entering the hollow shaft and sealed to the passagaways 28 by glands such that the platform can rotate without the feed pipes rotating also.

Figure 1:
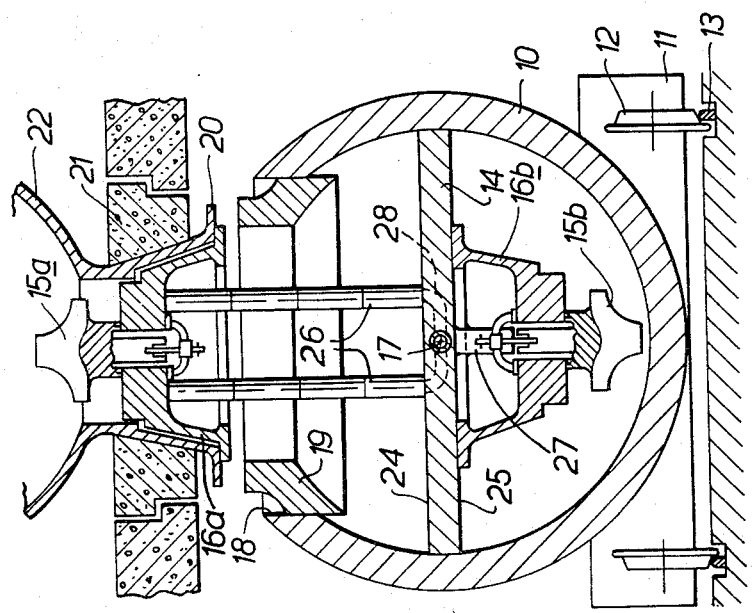

To replace the active impeller 15a in the shell 21 using the apparatus described above the clean impeller 15b is attached to the jacks 27 on the side 25 of the support platform 14, that side being uppermost, and the flask 10 is positioned under the impeller 15a (FIG. 1). The jacks are raised out of the flask 10 and are attached to the skirt 16a so as to support it (FIG. 1). The skirt 16a is then disconnected from the heat exchanger shell 22 and the neck portion 19 of the flask 10 is raised to make a joint with the flange 20. The jacks 26 lower the skirt 16a and impeller 15a onto the side 24 of the platform 14 (FIG. 2). The platform 14 is rotated through 180° to bring the clean impeller 15b into position for jacking into the heat exchanger, an intermediate position being shown in FIG. 3. The jacks 27 now raise the impeller 15b into the heat exchanger shell 22 and load the skirt 16b against the flange 20 so as to make a temporary seal between the skirt and the flange. The flask 10 is purged with air, the neck portion 19 is lowered and a permanent joint is made between the flange 20 and skirt 16b. The jacks 27 are disengaged from the skirt 16b and the flask 10 is wheeled away with the active impeller in a shielded hemisphere below the platform 14.

What we claim is:
1. An apparatus for replacing an impeller in a radioactive environment within a pressure vessel having an aperture therein comprising a shielded flask having an access opening, an impeller support platform, means rotatably mounting said support platform within said flask, a plurality of impellers, means mounting said impellers on said platform for raising and lowering said impellers with respect to the platform, and means for sealing said flask about the aperture in the pressure vessel when said aperture is in register with the access opening in said flask, whereby the flask may be positioned with the access opening in register with said aparture in the pressure vessel and the platform rotated to selective positions to permit each of the impellers to be raised through the access opening and aperture by said raising and lowering means for replacement of each impeller.

2. An apparatus according to claim 1 wherein said apparatus further comprises means for purging said flask.

3. An apparatus according to claim 1 wherein the flask is substantially spherical in shape.

References Cited by the Examiner
UNITED STATES PATENTS

| | | | |
|---|---|---|---|
| 2,214,195 | 9/40 | Frankley | 137—329 |
| 2,464,473 | 3/49 | Wessel | 230—235 |
| 2,514,431 | 7/50 | West | 137—329 |
| 2,987,762 | 6/61 | Firnhaber | 65—14 |
| 3,059,276 | 10/62 | Yokana | 18—12 |

FOREIGN PATENTS

| | | |
|---|---|---|
| 545,491 | 10/56 | Belgium. |
| 1,143,082 | 4/57 | France. |
| 749,685 | 5/56 | Great Britain. |

CARL D. QUARFORTH, Primary Examiner.
REUBEN EPSTEIN, Examiner.